July 3, 1928.

J. A. NORDIN 1,675,659

MEAT SLICING MACHINE

Filed Dec. 2, 1925

2 Sheets-Sheet 1

J. A. Nordin
inventor

By: Marks and Clerk
Attys

July 3, 1928.

J. A. NORDIN

MEAT SLICING MACHINE

Filed Dec. 2, 1925

1,675,659

2 Sheets-Sheet 2

J. A. Nordin
Inventor

Patented July 3, 1928.

1,675,659

UNITED STATES PATENT OFFICE.

JOSEF AUGUST NORDIN, OF STOCKHOLM, SWEDEN, ASSIGNOR TO AKTIEBOLAGET STILLE-WERNER, OF STOCKHOLM, SWEDEN.

MEAT-SLICING MACHINE.

Application filed December 2, 1925, Serial No. 72,781, and in Sweden October 24, 1925.

This invention relates to meat-slicing machines of the type, in which the table, carrying the meat etc. and provided on a reciprocating slide, is intermittently advanced transversely of the cutting direction by means of a mechanically rotated feed screw, journaled on the slide. The said table must be returned now and then, which generally has been effected by the said feed screw being rotated manually in a direction opposite to that, in which it is rotated mechanically. This involves some disadvantages consisting for instance in the returning being effected comparatively slowly owing to the fact that the feed screw must be rotated manually through a great number of revolutions, before the said table has been wholly returned.

According to this invention the said disadvantages are removed by the provision of a special returning and adjusting mechanism, which is adapted, when acted upon, to automatically disengage a member, which normally engages the feed screw for the feeding of the table, and, after the disengaging, to effect a rapid returning or adjusting of the table for instance by the turning of a crank through a small number of revolutions. The said special returning mechanism is preferably used in such cases, in which greater movements of the table are wanted.

Figure 1:
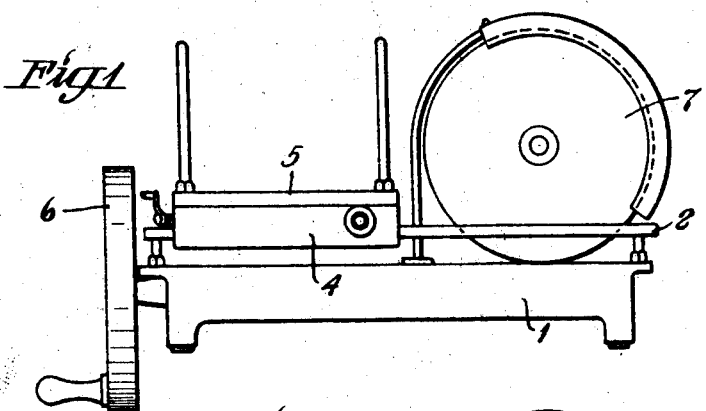
Figure 2:
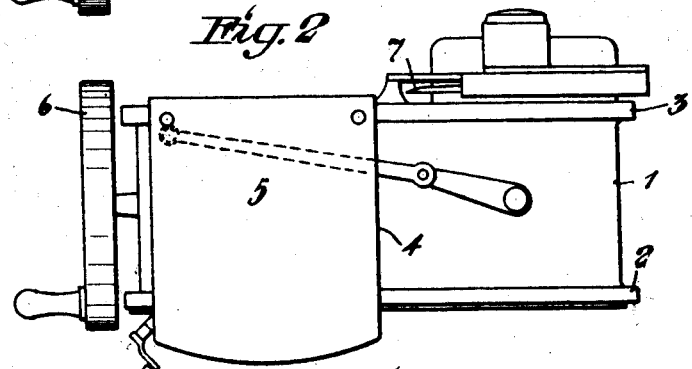
Figure 5:
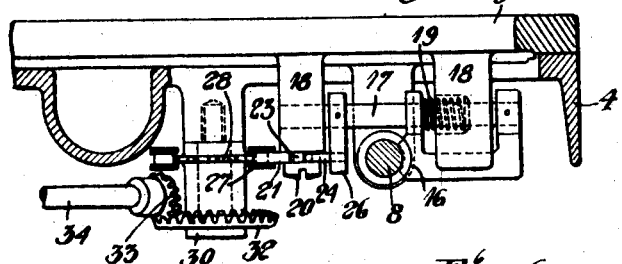
Figure 6:
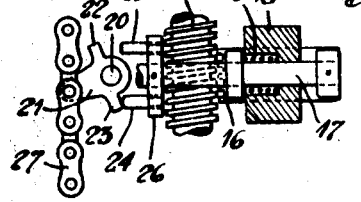
Figure 3:
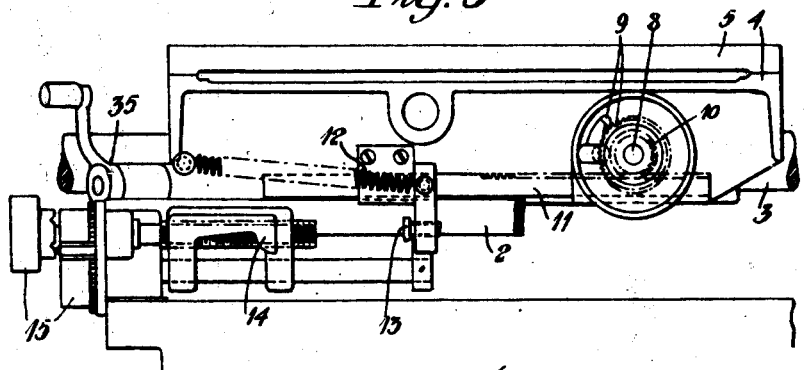
Figure 4:
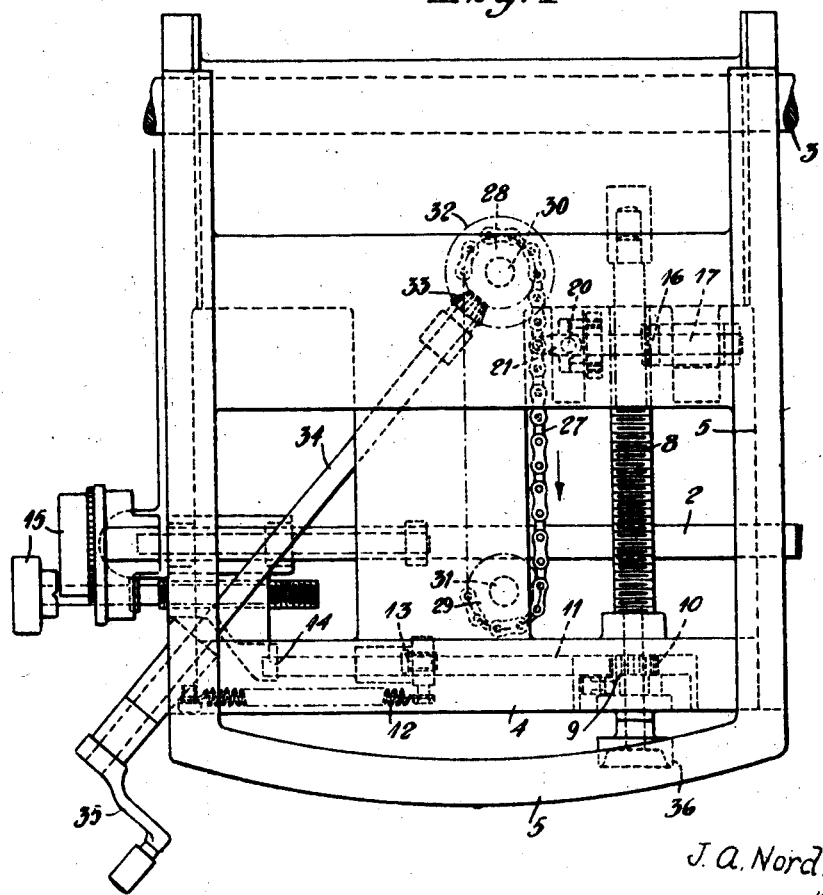

A form of the invention is shown in the accompanying drawings. Figs. 1 and 2 show diagrammatically a meat-slicing machine in a side view and in plan view respectively. Fig. 3 shows on a greater scale and viewed from the rear end the slide and the table of the machine. Fig. 4 is a plan view of the parts shown in Fig. 3; a plate of sheet metal covering the table being removed. Figs. 5 and 6 show details in a side view and a top view respectively.

The meat-slicing machine comprises, as usual, a frame 1, a slide 4 reciprocated on guides 2 and 3, a table 5, carrying the meat and slidable on the slide 4, a fly-wheel 6 and a rotatable disk-knife 7. The said fly-wheel 6 is connected by suitable motion transmitting members with the slide 4 as well as with the disk-knife 7, so that the slide and the knife are driven by the same in the well known manner.

In the slide 4 feed-screw 8 is journaled. Figs. 3 and 4, which is rotated mechanically through the action of the reciprocating slide 4. The rotation is effected by a pawl and ratchet mechanism 9, a toothed wheel 10, a rack 11, a spring 12, an abutment 13 provided on the said rack and an abutment 14 provided in an adjustable manner in the frame 1. As the slide is moved in the one direction abutment 13 strikes the abutment 14, which results in the rack 11 being moved longitudinally, so that the tension of the spring 12 is increased and the spring returns the rack into its starting position, as the slide is moved in the opposite direction. During the movement of the rack the ratchet mechanism 9 effects the rotation of the feed-screw 8. The amount of the rotary motion may be varied by adjusting the abutment 14 by means of a device 15. The members now described do not belong especially to the invention, for which reason a more special description of the same is not necessary.

The said feed-screw 8 is adapted to move the table 5 in a direction perpendicular to the plane of the disk-knife 7. For the said purpose a nut-segment 16 is provided on the lower side of the table, which normally engages the threads of the feed-screw, so that the feed-screw when rotated moves the nut-segment and thus the table. The nut-segment 16 is fixed to a shaft 17, which is slidable in ears 18, extending downwards from the lower side of the table 5. Shaft 17 is acted upon by a spring 19, which tends to slide the shaft 17 into such a position, that the nut-segment engages the threads of the feed-screw 8, see Fig. 5. In one of the said ears 18 a screw 20 is fixed, on which is swingable an arm 21, provided with two lateral projections 22 and 23, Fig. 6. Said projections 22 and 23 bear normally against two pins 24 and 25, fixed in a cross piece 26, which is fixed to the shaft 17. Arm 21 is jointed to an endless chain 27, which passes round two sprocket wheels 28 and 29, rotatable on pins 30 and 31, fixed in the slide 4. Sprocket wheel 28 has a downwardly extending hub, the lower end of which constitutes a bevel-wheel 32. Figs. 4 and 5, engaging a bevel-wheel 33, which is fixed to a shaft 34 journaled in the slide 4. Shaft 34 extends outside the slide at one of its corners and is provided with a crank 35.

As the fly-wheel 6 is rotated, slide 4 is reciprocated on the guides 2 and 3, so that the disk-knife, which simultaneously is rotated, cuts slices from the meat suitably clamped on the table 5. Immediately before each cutting operation the table together with the meat is fed forwards perpendicularly to the plane of the disk-knife and through a distance equal to the thickness of the slice cut from the meat. The said feeding is effected mechanically by means of the feed-screw 8, ratchet mechanism 9, toothed wheel 10, rack 11, spring 12, abutments 13 and 14 and the nut-segment 16. The feeding must however, sooner or later, be interrupted and the table returned. For the returning of the table it is necessary to turn the crank 35 only through a few revolutions. As the crank 35 is turned clockwise, chain 27 will be moved in the direction indicated by the arrow in Fig. 4, which results in the arm 21, which is swingable on the screw 20 fixed in the table 5, being swung through a certain angle, see Fig. 6. The lateral projection 23 hereby acts upon the pin 24, so that the cross piece 26 and the shaft 17 are moved backwards against the tension of the spring 19. Nut-segment 16 partakes in the said backward movement, whereby it is disengaged from the threads of the feed-screw 8. In this manner the table 5 is disengaged from the feed-screw 8 automatically and may be moved directly by the chain 27 acting through the arm 21 and the screw 20. Owing to the ratio of gearing two or three turns of the crank 35 will be sufficient for returning the table to its initial position.

As the table 5 is fed by means of the feed screw 8 the chain 27 with its co-working mechanism 28, 29, 32, 33, 34 and 35 also is actuated. This is accomplished by means of the screw 20 and the swingable arm 21. The resistance of the chain 27 to sudden motion will tend to cause the lateral projection on the swingable arm 21 to force the shaft 17 backwards against the tension of the spring 19 and cause the nut segment to be disengaged from the feed screw. The tension of the spring 19, however, is sufficient to hold the nut segment 16 in engagement against this force, which is easily overcome. When on the other hand the table 5 is to be moved by means of the crank 35 a considerable resistance is raised in the parts so that a great force acts upon the shaft 17 and for this reason the nut segment is disengaged from the feed screw against the tension of the spring 19. For the rest the pitch of the feed screw is small so that the pressure of the nut segment on the threads of the feed screw has as a matter of fact no turning effect on the feed screw.

A rapid advancing of the table to a desired position may also be effected by means of the crank 35. Also in this case the table 5 will be disengaged from the feed-screw 8 in a manner analogous to that described above with the exception that, by turning of the crank in the opposite direction, the lateral projection 22 will act upon the pin 25 and thus move the shaft 17 and disengage the nut-segment 16 from the feed-screw 8. On the whole, the crank 35 may always be used when a comparatively great movement of the table in either direction is wanted. Owing to the fact that the table is disengaged from the feed-screw 8 automatically, the operator need not effect any disconnecting operations manually. As soon as the movement of the chain 27 is interrupted, spring 19 returns the nut-segment into engagement with the feed-screw. If then the threads of the feed-screw and the nut-segment should not engage each other properly, perfect engagement is effected as soon as the feed-screw is again rotated by means of the fly-wheel 6.

The feed-screw may be rotated in known manner by means of a handle 36 or the like fixed on its end.

The invention may evidently be modified in many respects especially regarding the special returning mechanism without exceeding the limits of the same.

I claim:

1. In a slicing machine of the reciprocating slide and cross feed table type, a separate returning and shifting mechanism for the said table comprising a motion transmitting member supported by the slide, a pivoted member connected to said motion transmitting member and pivotally supported by the table, a shiftable nut segment supported by the table, projecting parts on the said nut segment cooperating with the pivoted member and a spring tending to move the nut segment in engagement with the feed screw, which serves to feed the table by means of the said segment, the motion transmitting member being adapted, when acted upon to turn the pivoted member so that the same acts upon the projecting parts of the nut segment and disengage the latter from the feed screw, the continued motion of the motion transmitting member then causing a rapid movement of the table independent of the feed screw and the nut segment.

2. A slicing machine as claimed in claim 1, in which the motion transmitting member consists of a chain mounted on the reciprocating slide.

3. A slicing machine as claimed in claim 1, in which the motion transmitting member is driven by means of a gearing and a shaft extending outside the slide and provided with a crank, the ratio of gearing being so adapted that a few turns of the crank are sufficient for moving the table between its terminal positions.

In testimony whereof I have hereunto affixed my signature.

JOSEF AUGUST NORDIN.